United States Patent
Danielsson et al.

(10) Patent No.: US 12,283,057 B2
(45) Date of Patent: Apr. 22, 2025

(54) DEVICE AND METHOD FOR ENHANCING TRACKING OF OBJECTS IN A SCENE CAPTURED IN A VIDEO SEQUENCE

(71) Applicant: Axis AB, Lund (SE)

(72) Inventors: Niclas Danielsson, Lund (SE); Markus Skans, Lund (SE); Anton Öhrn, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/439,200

(22) Filed: Feb. 12, 2024

(65) Prior Publication Data
US 2024/0303828 A1    Sep. 12, 2024

(30) Foreign Application Priority Data
Mar. 9, 2023   (EP) ..................................... 23160912

(51) Int. Cl.
*G06T 7/246*      (2017.01)

(52) U.S. Cl.
CPC .... *G06T 7/246* (2017.01); *G06T 2207/10016* (2013.01); *G06T 2207/20021* (2013.01)

(58) Field of Classification Search
CPC ........... G06T 7/246; G06T 2207/10016; G06T 2207/20021; G06T 2207/20084; G06T 7/248; G06V 20/20; G06V 10/26; G06V 10/82; G06V 20/40

See application file for complete search history.

(56) References Cited

U.S. PATENT DOCUMENTS

| | | | |
|---|---|---|---|
| 2018/0374233 A1* | 12/2018 | Zhou | G06F 18/22 |
| 2021/0201039 A1* | 7/2021 | Frei | G06V 20/41 |
| 2021/0264496 A1* | 8/2021 | Claros | G06V 40/103 |
| 2022/0245924 A1* | 8/2022 | He | G06T 7/246 |
| 2022/0327837 A1* | 10/2022 | Datar | G06V 40/10 |
| 2022/0358314 A1* | 11/2022 | Shen | G06N 20/00 |

OTHER PUBLICATIONS

Xinwen et al, ("multi-object tracking with Siamese-RPN and adaptive matching strategy", Signal, Image and Video Processing, (2022)) (Year: 2022).*

(Continued)

*Primary Examiner* — Amara Abdi
(74) *Attorney, Agent, or Firm* — Volpe Koenig (57) ABSTRACT

A method for selecting a crop score threshold for enhancing tracking of objects in a scene captured in a video sequence is disclosed. A respective track is obtained for two different objects, each track comprising crops of object instances of the objects in in a video sequence, each crop having a crop score and a feature vector. Each track is split into respective more tracklets thereby forming four or more tracklets. For each candidate crop score threshold a respective difference between each tracklet and each other tracklet is determined based on differences between feature vectors of crops having a crop score above the candidate crop score threshold of each tracklet, and each other tracklet. A crop score threshold is selected from the set of crop score thresholds resulting in a maximum difference between the differences between tracklets of different tracks and the differences between tracklets of the same track.

12 Claims, 5 Drawing Sheets

(56) References Cited

OTHER PUBLICATIONS

Mk Bashar, ("multiple Object tracking in recent times: A literature review", (2022)) (Year: 2022).*
Prokaj et al, ("Inferring Tracklets for Multi-Object Tracking", IEEE, Jun. 2011, pp. 37-44) (Year: 2011).*
Bashar, M., et al., "Multiple Object tracking in recent times: A literature review", (2022).
Gao, X., et al., "Multi-object tracking with Siamese-RPN and adaptive matching strategy", Signal, Image and Video Processing, (2022).
Extended European Search Report issued on Sep. 1, 2023 for European Patent Application No. 23160912.4.

* cited by examiner

DEVICE AND METHOD FOR ENHANCING TRACKING OF OBJECTS IN A SCENE CAPTURED IN A VIDEO SEQUENCE

TECHNICAL FIELD

The present invention relates to tracking of objects, and specifically to selecting a crop score threshold for enhancing tracking of objects in a scene captured in a video sequence.

BACKGROUND

In prior art, when tracking objects in a scene captured in a video sequence, tracklets are identified including crops from a sub-set of subsequent image frames of the video sequence. Each crop of a tracklet is a portion of an image frame of the video sequence and is associated with a detection in the image frame. For example, each crop may be the portion of a corresponding image frame that is within a bounding box around a detected object in the image frame. All crops of a tracklet have been determined to relate to the same object according to a given criterion. Tracklets belonging to the same object should then be connected to produce a single track relating to that same object. To determine if two different tracklets belong to the same tracked object, feature vectors of the crops of the respective tracklet may be used. Such feature vectors may for example be feature vectors determined by means of a convolutional neural network. Specifically, a feature vector may be determined for each of the two tracklets, e.g. as average of the feature vectors of the crops of the respective tracklet, and the tracklets may then be determined as belonging to the same tracked object if the distance between their feature vectors is less than a threshold. A problem that may arise in such prior art schemes for connecting tracklets is that the determined feature vector for the tracklets may not be representative for the object and hence errors may occur such as two tracklets being determined not to relate to the same object even if they actually do.

SUMMARY OF THE INVENTION

An object of the present invention is to provide a method and a device for selecting a crop score threshold for enhancing tracking of objects in a scene captured in a video sequence which overcome or mitigate issues in prior art.

The present disclosure makes use of a recognition that a crop score of each crop can be used to determine which crops of a tracklet should be used to determine a difference between the tracklet and other tracklets.

According to a first aspect, a method for selecting a crop score threshold for enhancing tracking of objects in a scene captured in a video sequence is provided. A respective track is obtained for each one of two different objects, wherein each track comprises crops of object instances of the respective object in the scene captured in a calibration video sequence, and wherein each crop has a crop score and a feature vector. Each track is then split into respective two or more tracklets thereby forming four or more tracklets. For each candidate crop score threshold of a set of candidate crop score thresholds: a respective difference between each tracklet of the four or more tracklets and each other tracklet of the four or more tracklets is determined based on differences between feature vectors of crops having a crop score above the candidate crop score threshold of each tracklet of the four or more tracklets and feature vectors of crops having a crop score above the candidate crop score threshold of each other tracklet of the four or more tracklets. A crop score threshold is then selected from the set of candidate crop score thresholds resulting in a maximum difference between a measure of the determined differences between tracklets of different tracks and a measure of the determined differences between tracklets of the same track.

By selecting a crop score threshold such that difference between a measure of the determined differences between tracklets of different tracks and a measure of the determined differences between tracklets of the same track is maximized, a more accurate differentiation between tracklets of different tracks and tracklets from the same track is enabled. Specifically, a difference threshold on a determined difference between tracklets can be set for which it is likely that a determined difference between tracklets of different tracks is greater than the difference threshold and that a determined difference between tracklets of the same track is less than the difference threshold.

By a "crop" is meant a region of an image frame of a video sequence. Typically, the crop is done in such a way that the crop mainly contains pixels depicting an object. The crop may for example correspond to the region enclosed by a bounding box. As an alternative, the crop may correspond to a rectangular image area wherein a segmentation mask masks a detected object and wherein pixels within the rectangular image area and not belonging to the detected object are equal to zero.

By a "tracklet" is meant a portion of a track relating to an object in relation to a sub-set of sequential image frames of the video sequence. The combination of all tracklets relating to the same object in relation to the video sequence make up a track relating to the object in relation to the video sequence.

By a "feature vector" is generally a n-dimensional vector of numerical features that represent an object. This is a common representation of an object for e.g. machine learning algorithms which typically require a numerical representation of objects for facilitating for example data processing and statistical analysis. The feature vectors may for example be received from a machine learning module trained to extract similar feature vectors for the same object in different image frames and to extract less similar feature vectors for different objects.

The act of determining a respective difference may comprise determining a respective feature vector for each of the four or more tracklets based on feature vectors of crops of the tracklet having a crop score above the candidate crop score threshold, and determining the respective difference between each tracklet of the four or more tracklets and each other tracklet of the four or more tracklets as a respective difference between each determined respective feature vector and each other determined respective feature vector. In the act of selecting a crop score threshold from the set of candidate crop score thresholds, the crop score threshold is then selected that results in a maximum difference between a measure of the determined differences between feature vectors from tracklets of different tracks and a measure of the determined differences between feature vectors from tracklets of the same track.

In the act of determining a respective feature vector, the respective feature vector for each of the four or more tracklets may be determined as a mean or median of the feature vectors of crops of the tracklet having a crop score above the candidate crop score threshold.

In the act of selecting a crop score threshold, the measure may be a mean or median.

The method according to the first aspect may further comprise identifying a subset of candidate crop score thresholds consisting of each candidate crop score threshold of the candidate crop score thresholds for which a number of crops having a crop score above the candidate crop score threshold is larger than or equal to a first required number for each tracklet of the four or more tracklets. In the act of selecting a crop score threshold, the crop score threshold is then selected from the subset of candidate crop score thresholds.

By selecting the crop score threshold from the subset of candidate crop score threshold, a crop score will be selected resulting in a larger likelihood that each tracklet identified in relation to an object in the scene will include at least one crop having a crop score above the selected crop score.

The method according to the first aspect may further comprise obtaining two further tracklets relating to one or more objects, wherein each tracklet comprises crops of object instances of one of the one or more objects in the scene captured in the video sequence, and wherein each crop has a crop score and a feature vector. A respective feature vector is then determined for each tracklet of the two further tracklets based on feature vectors of crops of the respective tracklet having a crop score above the selected crop score threshold, a difference between the determined respective feature vector of the further two tracklets is then determined. Whether the two further tracklets relate to a same object or to different objects is then determined based on the determined difference. For example, the two further tracklets may be determined to relate to a same object on condition that the determined difference is below a difference threshold, and determined to relate to different objects on condition that the determined difference is above the difference threshold. In the act of determining a respective feature vector for each of the two further tracklets, if the number of crops of the tracklet having a crop score above the selected crop score threshold is less than a second required number, the respective feature vector may be determined based further on additional crops of the tracklet having largest crop scores of crops having crop scores equal to or below the selected crop score threshold such that the number of crops on which the feature vector is based is equal to the second required number.

According to a second aspect, a non-transitory computer-readable storage medium is provided having stored thereon instructions for implementing the method according to the first aspect or the method according to the first aspect, when executed by a device having processing capabilities.

The above-mentioned optional features of the method according to the first aspect, when applicable, apply to the non-transitory computer-readable storage medium of the second aspect as well. To avoid undue repetition, reference is made to the above.

According to a third aspect, a device for enhancing tracking of objects in a scene captured in a video sequence is provided. The device comprises circuitry configured to execute a first obtaining function, a splitting function, a first determining function, and a selecting function. The first obtaining function is configured to obtain a respective track for each one of two different objects, wherein each track comprises crops of object instances of the respective object in the scene captured in a calibration video sequence, and wherein each crop has a crop score determined by a classifier and a feature vector. The splitting function is configured to split each track into respective two or more tracklets thereby forming four or more tracklets. The first determining function is configured to, for each of a set of candidate crop score thresholds: determine a respective difference between each tracklet of the four or more tracklets and each other tracklet of the four or more tracklets based on differences between feature vectors of crops having a crop score above the candidate crop score threshold of each tracklet of the four or more tracklets and feature vectors of crops having a crop score above the candidate crop score threshold of each other tracklet of the four or more tracklets. The selecting function is configured to select a crop score threshold from the set of candidate crop score thresholds resulting in a maximum difference between a measure of the determined differences between tracklets of different tracks and a measure of the determined differences between tracklets of the same track.

The above-mentioned optional features of the method according to the first aspect, when applicable, apply to the device of the third aspect as well. To avoid undue repetition, reference is made to the above.

According to a fourth aspect, a method for enhancing tracking of objects in a scene captured in a video sequence is provided. A track relating to an object of one or more objects in the scene captured in the video sequence are obtained, wherein the track comprises crops of object instances of the object of the one or more objects, and wherein each crop has a crop score and a feature re-identification vector. A feature vector for the track is determined based on feature vectors of crops of the track having a crop score above a crop score threshold selected for the scene. A further crop of an object instance of one of the one or more objects in the scene captured in the video sequence is obtained, wherein the crop has a crop score selected for the scene and a feature vector. On condition that the crop score of the further crop is greater than the crop score threshold selected for the scene a difference is then determined between the determined feature vector of the track and the feature vector of the further crop. Whether the further crop and the track relate to a same object or to different objects is determined based on the determined difference. The selected crop score threshold may for example be selected according to the method according to the first aspect.

By only determining the difference and determining whether the further crop relates to the same object as the track if the further crop has a crop score greater than the crops score threshold selected for the scene, erroneous identification of further crops relating to the same object can be avoided. Furthermore, processing in relation to further crops having a crop score equal to or less than the crop score threshold can be avoided.

According to a fifth aspect, a device for enhancing tracking of objects in a scene captured in a video sequence is provided. The device comprises circuitry configured to execute a first obtaining function, a first determining function, a second obtaining function, and a second determining function. The first obtaining function is configured to obtain a track relating to an object of one or more objects in the scene captured in the video sequence, wherein the track comprises crops of object instances of the object of the one or more objects, and wherein each crop has a crop score and a feature re-identification vector. The first determining function is configured to determine a feature vector for the track based on feature vectors of crops of the tracklet having a crop score above a selected crop score threshold. The second obtaining function is configured to obtain a further crop of an object instance of one of the one or more objects in the scene captured in the video sequence, wherein the crop has a crop score selected for the scene and a feature vector. The second determining function is configured to, on condition that the crop score of the further crop is greater than the crop score threshold selected for the scene, determine difference is between the determined respective feature vector of the two tracklets, and determine whether the further crop and the track relate to a same object or to different objects based on the determined difference. The crop score threshold selected for the scene may for example be selected according to the method according to the first aspect.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

DETAILED DESCRIPTION

The present invention will now be described hereinafter with reference to the accompanying drawings, in which currently preferred embodiments of the invention are illustrated. This invention may, however, be embodied in many different forms and should not be construed as limited to the embodiments set forth herein.

The invention is applicable in scenarios in which objects are tracked in a scene captured over time in a video sequence. Such a scenario may for example arise when a scene is captured in a sequence of image frames by means of a surveillance camera. The objects have been detected using an object detection module using any kind of object detection. A feature vector may be extracted for a crop relating to a tracked object in each image frame in the object detection or it may be extracted in a separate process using the object detection as an input.

In the following, embodiments of a method 100 for selecting a crop score threshold for enhancing tracking of objects in a scene captured in a video sequence will be discussed with reference to FIGS. 1A and 1B.

A respective track is obtained S110 for each one of two different objects. Each track comprises crops of object instances of the respective object in the scene captured in a calibration video sequence. Each crop has a crop score and a feature vector. In addition to the crops comprised in each track, each track may further comprise estimations in relation to some frames for which no crop is available, e.g. because no object was detected in those frames. Such a crop score could be determined by annotating crops based on whether they contribute positively or negatively to solving a problem and then training a classifier on this data.

The objects may relate to vehicles, people, faces, bags, pets, or any other objects that might be of interest in different situations.

A crop score of a crop may for example be a value that indicates how well the crop works for re-identification or in other words how good a crop is for use as input for extracting a feature vector from it to be used for object re-identification. In alternative, a crop score of a crop may be a value that indicates how well the crop works for object classification or in other words how good a crop is for use as input for extracting a feature vector from it to be used for object classification. Such a crop score may be determined by means of a classifier trained to calculate a value, i.e. crop score, for a crop which specifies how similar the crop is to what is considered a 'good' crop. For example, a crop score may be a value between 0 and 1.

A feature vector of a crop is a vector describing features of the object. The feature vectors may for example be received from a machine learning module, such as a neural network trained to extract similar feature vectors for the same object in different image frames and to extract less similar feature vectors for different objects. In alternative, the feature vectors may be received from other types of modules, such as modules based on support vector machine or colour histograms. The way the crop score is determined will depend on the type of module the feature vectors are received from.

Each track is then split S120 into respective two or more tracklets thereby forming four or more tracklets. It is to be noted that the two tracks received in relation to the calibration video sequence are known to relate to a respective one of the two different objects. Hence, it is known which of the four or more tracklets belong to which track. This may for example be achieved by selecting a calibration video sequence with well-separated tracks from two different and simultaneously tracked objects in the scene.

For each candidate crop score threshold of a set of candidate crop score thresholds a respective difference between each tracklet of the four or more tracklets and each other tracklet of the four or more tracklets is determined S130. Each respective difference is based on a difference between feature vectors of crops having a crop score above the candidate crop score threshold of a tracklet of the four or more tracklets and feature vectors of crops having a crop score above the candidate crop score threshold of another tracklet of the four or more tracklets. Hence, a first difference is determined based on a difference between feature vectors of crops having a crop score above the candidate crop score threshold of a first tracklet and feature vectors of crops having a crop score above the candidate crop score threshold of a second tracklet, a second difference is determined based on a difference between feature vectors of crops having a crop score above the candidate crop score threshold of the first tracklet and feature vectors of crops having a crop score above the candidate crop score threshold of a third tracklet, and so on until there is a difference determined for each combination of tracklets of the four or more tracklets. Hence, for n tracklets, there will be $n*(n-1)/2$ differences determined for each candidate crop score. A difference between two feature vectors may for example be determined by determining a distance between the two feature vectors. The larger the distance between the two feature vectors, the larger the difference. Distance may for example be determined in $L^2$ norm (also called Euclidian norm).

The difference between two tracklets should preferably be determined such that it is larger with larger difference between feature vectors of crops having a crop score above the candidate crop score threshold of one of the two tracklets and feature vectors of crops having a crop score above the candidate crop score threshold of the other of the two tracklets. For example, the act of determining S130 a respective difference may comprise determining a respective feature vector for each of the four or more tracklets based on feature vectors of crops of the tracklet having a crop score above the candidate crop score threshold. The feature vector for a tracklet is preferably determined such that it reflects the feature vectors of crops having a crop score above the candidate crop score threshold for the tracklet, such as being a mean or a median of the feature vectors of crops of the tracklet having a crop score above the candidate crop score threshold. The respective difference between each tracklet of the four or more tracklets and each other tracklet of the four or more tracklets may then be determined as a respective difference between each determined respective feature vector and each other determined respective feature vector. In addition to determining a respective feature vector for each tracklet, a variance of the feature vectors may also be determined. In such a case, the respective difference between each tracklet of the four or more tracklets and each other tracklet of the four or more tracklets may then be determined as a respective difference between each determined respective feature vector and corresponding variance with or without weighting and each other determined respective feature vector and corresponding variance with or without weighting.

Furthermore, more than one feature vector may be determined for each tracklet when the tracked object of the tracklet has more than one appearance in the tracklet. For example, if the tracked object is a person, two feature vectors may be determined, a first feature vector relating to crops where the person is visible from the front and a second feature vector relating to crops where the person is visible from behind. The first and second feature vectors may then be determined using a mean or a median feature vector of the feature vectors of crops where the person is visible from the front and a second feature vectors of crops where the person is visible from behind, respectively. When determining a difference between a first tracklet and a second tracklet each having more than one feature vector, the difference may be determined as a measure of the respective difference between corresponding feature vectors of the first tracklet and the second tracklet. The measure may for example be a median or a mean.

The candidate crop scores of the set of candidate crop score thresholds will differ depending on the type of crop score used. If for example a crop score is used which may have values in the range 0 to 1, the candidate crop scores may be 0.1, 0.2, . . . , 0.9. Other ranges and other values within those ranges are of course possible.

A crop score threshold is then selected S140 from the set of candidate crop score thresholds resulting in a maximum difference between a measure of the determined differences between tracklets of different tracks and a measure of the determined differences between tracklets of the same track. The measure is preferably such that it reflects the determined differences between tracklets of different tracks and the determined differences between tracklets of the same track, respectively, such as being a mean or a median.

Furthermore, the crop score threshold is preferably selected such that the measure of the determined differences between tracklets of the same track is less than the measure of the determined differences between tracklets of different tracks.

In embodiments where the act of determining S130 a respective difference comprises determining a respective feature vector for each of the four or more tracklets and the respective difference between each tracklet and each other tracklet is determined as a respective difference between each determined respective feature vector and each other determined respective feature vector, the crop score threshold is selected that results in a maximum difference between a measure of the determined differences between feature vectors for tracklets of different tracks and a measure of the determined differences between feature vectors for tracklets of the same track. The measure is preferably such that it reflects the determined differences between the feature vectors for tracklets of different tracks and the determined differences between the feature vectors for tracklets of the same track, respectively, such as being a mean or a median. The crop score threshold is then further preferably selected such that the measure of the determined differences between feature vectors for tracklets of the same track is less than the measure of the determined differences between feature vectors for tracklets of different tracks.

The selected crop score threshold may then be used to determine which crops of a track to be used when determining a feature vector for the track to be used for comparison to a feature vector of a further crop or another track when determining whether the compared tracks relate to the same object or different objects.

The selected crop score threshold is typically used for the scene in relation to which it has been selected by means of the method 100. For a different scene a new crop score threshold is typically determined by performing the method 100 in relation to the different scene.

The crop score threshold should be high enough so that the crops used for re-identification is sufficiently 'good'. However, if the crop score threshold is too high, there may not be any crops above the threshold for short tracks. The method 100 may thus further comprise identifying S135 a subset of candidate crop score thresholds consisting of each candidate crop score threshold of the candidate crop score thresholds for which a number of crops having a crop score above the candidate crop score threshold is larger than or equal to a first required number for each tracklet of the four or more tracklets. In the act of selecting a crop score threshold, the crop score threshold is then selected from the subset of candidate crop score thresholds. By selecting the crop score threshold from the subset of candidate crop score threshold, a crop score threshold will be selected resulting in a larger likelihood that each track identified in relation to an object in the scene will include at least one crop having a crop score above the selected crop score threshold.

Once the crop score threshold has been selected, the selected crop threshold may be deployed to determine if two further tracks relate to a same object or to different objects. The method 100 may thus further comprise obtaining S150 two further tracks relating to one or more object. Each track of the two further tracks comprises crops of object instances of one of the one or more objects in the scene captured in the video sequence, and each crop has a crop score and a feature vector. A respective feature vector is then determined S160 for each track of the two further tracks based on feature vectors of crops of the respective track having a crop score above the selected crop score threshold from the act of selecting S140. A difference between the determined respective feature vector of the further two tracks is then determined S170. The difference between two feature vectors may for example be determined by determining a distance between the two feature vectors. The larger the distance between the two feature vectors, the larger the difference. Distance may for example be determined in $L^2$ norm (also called Euclidian norm).

Whether the two further tracks relate to a same object or to different objects is then determined S180 based on the determined difference. For example, the two further tracks may be determined to relate to a same object on condition that the determined difference is below a difference threshold, and determined to relate to different objects on condition that the determined difference is above the difference threshold. The difference threshold may be set based on the measure of the determined differences between tracks of different tracks and the measure of the determined differences between tracks of the same track for the selected crop score threshold of the act of selecting S140. Specifically, the difference threshold may be set as a mean of the measure of the determined differences between tracks of different tracks and the measure of the determined differences between tracks of the same track for the selected crop score threshold of the act of selecting S140. For example, the measure may be a mean or a median. If for example the measure of the determined differences between tracks of different tracks is 1.2 and the measure of the determined differences between tracks of the same track is 0.2, the difference threshold may be set to 0.7.

To ensure that at least a second required number of crops are used for each further track to determine the respective feature vector for each of the two further tracks, if the number of crops of the track having a crop score above the selected crop score threshold is less than a second required number, the respective feature vector may be determined based further on additional crops of the track having largest crop scores of crops having crop scores equal to or below the selected crop score threshold such that the number of crops on which the feature vector is based is equal to the second required number. Hence, if a track of the two further tracks have less crops than the second required number which have a crop score above the selected crop score threshold, additional crops are used to determine the feature vector for the track. Additionally, a further crop score threshold may be set which is a lower crop score, wherein crops are not used for determining the feature vector even if this results in fewer than the second required number of crops for determining the feature vector.

Figure 2:
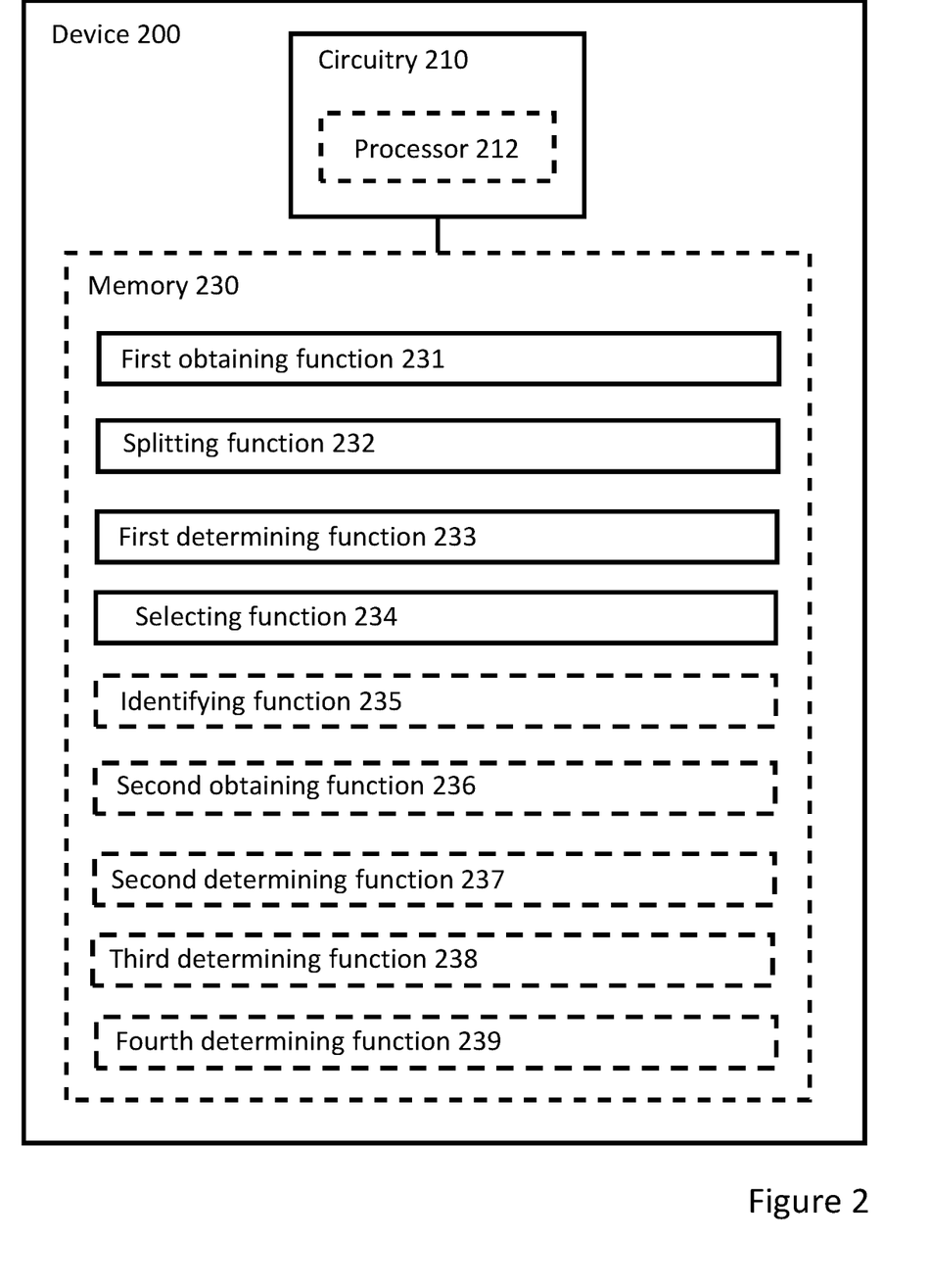
FIG. 2 shows a schematic diagram in relation to embodiments of a device of the present disclosure.

In the following, embodiments of a device 200 for selecting a crop score threshold for enhancing tracking of objects in a scene captured in a video sequence will be discussed with reference to FIG. 2.

The device 200 comprises circuitry 210. The circuitry 210 is configured to carry out functions of the device 200. The circuitry 210 may include a processor 212, such as a central processing unit (CPU), microcontroller, or microprocessor. The processor 212 is configured to execute program code. The program code may for example be configured to carry out the functions of the device 200.

The device 200 may further comprise a memory 230. The memory 230 may be one or more of a buffer, a flash memory, a hard drive, a removable media, a volatile memory, a non-volatile memory, a random access memory (RAM), or another suitable device. In a typical arrangement, the memory 230 may include a non-volatile memory for long term data storage and a volatile memory that functions as device memory for the circuitry 210. The memory 230 may exchange data with the circuitry 210 over a data bus. Accompanying control lines and an address bus between the memory 230 and the circuitry 210 also may be present.

Functions of the device 200 may be embodied in the form of executable logic routines (e.g., lines of code, software programs, etc.) that are stored on a non-transitory computer readable medium (e.g., the memory 230) of the device 200 and are executed by the circuitry 210 (e.g., using the processor 212). Furthermore, the functions of the device 200 may be a stand-alone software application or form a part of a software application that carries out additional tasks related to the device 200. The described functions may be considered a method that a processing unit, e.g. the processor 212 of the circuitry 210 is configured to carry out. Also, while the described functions may be implemented in software, such functionality may as well be carried out via dedicated hardware or firmware, or some combination of hardware, firmware and/or software.

The circuitry 210 is configured to execute a first obtaining function 231, a splitting function 232, a first determining function 233, and a selecting function 234.

The first obtaining function 231 is configured to obtain a respective track for each one of two different objects, wherein each track comprises crops of object instances of the respective object in the scene captured in a calibration video sequence, and wherein each crop has a crop score determined by a classifier and a feature vector.

The splitting function 232 is configured to split each track into respective two or more tracklets thereby forming four or more tracklets.

The first determining function 233 is configured to, for each of a set of candidate crop score thresholds: determine a respective difference between each tracklet of the four or more tracklets and each other tracklet of the four or more tracklets based on differences between feature vectors of crops having a crop score above the candidate crop score threshold of each tracklet of the four or more tracklets and feature vectors of crops having a crop score above the candidate crop score threshold of each other tracklet of the four or more tracklets.

The selecting function 234 is configured to select a crop score threshold from the set of candidate crop score thresholds resulting in a maximum difference between a measure of the determined differences between tracklets of different tracks and a measure of the determined differences between tracklets of the same track.

The circuitry 210 may be further configured to execute an identifying function 235, a second obtaining function 236, a second determining function 237, a third determining function 238, and a fourth determining function 239.

The identifying function 235 is configured to identify a subset of candidate crop score thresholds for which a number of crops having a crop score above the candidate crop score threshold is larger than or equal to a first required number for each tracklet of the four or more tracklets. In the selecting function 234, the crop score threshold is then selected from the subset of candidate crop score thresholds.

In the first determining function 231, the respective feature vector for each of the four or more tracklets may be determined as a mean or median of the feature vectors of crops of the tracklet having a crop score above the candidate crop score threshold.

In the selecting function 234, the measure may be a mean or median.

The second obtaining function 236 is configured to obtain two further tracks relating to one or more objects, wherein each track comprises crops of object instances of one of the one or more objects in the scene captured in the video sequence, and wherein each crop has a crop score determined by a classifier and a feature vector.

The second determining function 237 is configured to determine a respective feature vector for each of the two further tracks based on feature vectors of crops of the track having a crop score above the selected crop score threshold.

The third determining function 238 is configured to determine a difference between the determined respective feature vector of the two further tracks.

The fourth determining function 239 is configured to determine whether the two further tracks relate to a same object or to different objects based on the determined difference.

The fourth determining function 239 may be configured to determine that the two further tracks relate to a same object on condition that the determined difference is below a difference threshold, and determine that the two further tracks relate to different objects on condition that the determined difference is above the difference threshold.

In the second determining function 237, if the number of crops of the track having a crop score above the selected crop score threshold is less than a second required number, the respective re-identification vector is determined based further on additional crops of the track having largest crop scores of crops having crop scores equal to or below the selected crop score threshold such that the number of crops on which the re-identification vector is based is equal to the second required number.

Further details regarding the functions the circuitry 210 is configured to execute are provided in relation to the corresponding acts of the method 100 for selecting a crop score threshold for enhancing tracking of objects in a scene captured in a video sequence.

Figure 3:
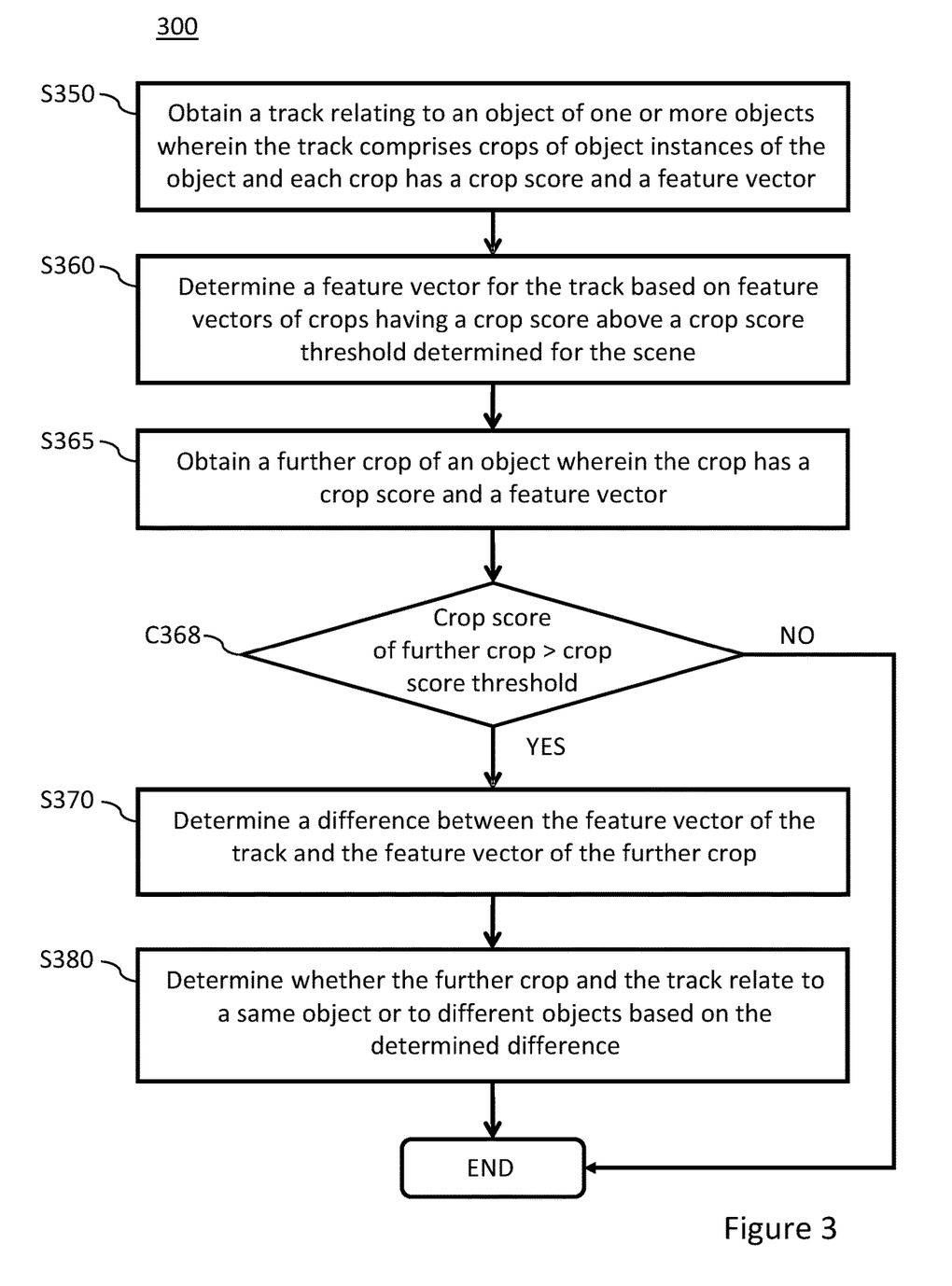
FIG. 3 show a flow chart in relation to embodiments of another method of the present disclosure.

In the following, embodiments of a method 300 for enhancing tracking of objects in a scene captured in a video sequence will be discussed in relation to FIG. 3.

In the following, embodiments of a method 300 for enhancing tracking of objects in a scene captured in a video sequence will be discussed with reference to FIG. 3.

A track relating to an object of one or more objects in the scene captured in the video sequence is obtained S350. The track comprises crops of object instances of the object of the one or more objects. Each crop has a crop score and a feature vector. The crop scores may be determined as described in relation to FIG. 1A.

A feature vector is determined S360 for the track based on feature vectors of crops of the respective track having a crop score above a crop score threshold selected for the scene. The feature vector may be determined as described in relation to FIG. 1A.

A further crop of an object instance of one of the one or more objects in the scene captured in the video sequence is obtained S365. The further crop has a crop score selected for the scene and a feature vector. The crop score may be determined as described in relation to FIG. 1A.

On condition C368 that the crop score of the further crop is greater than the crop score threshold selected for the scene a difference between the determined feature vector of the track and the feature vector of the further crop is determined S370. It is then determined S380 whether the further crop and the track relate to a same object or to different objects based on the determined difference. The difference may be determined as described in relation to FIG. 1A.

On condition C368 that the crop score of the further crop is not greater than the crop score threshold, the further crop is not considered for comparison to the track since this indicates that the crop is not sufficiently representative for the object such that feature vector comparison will not likely lead to a relevant result.

It should be noted that in other embodiments comparison is made between two tracks. Here, the comparison is made between a single crop and a track. To this end, the single crop may be special case of a track consisting only of one crop, namely the further crop.

Figure 1A:
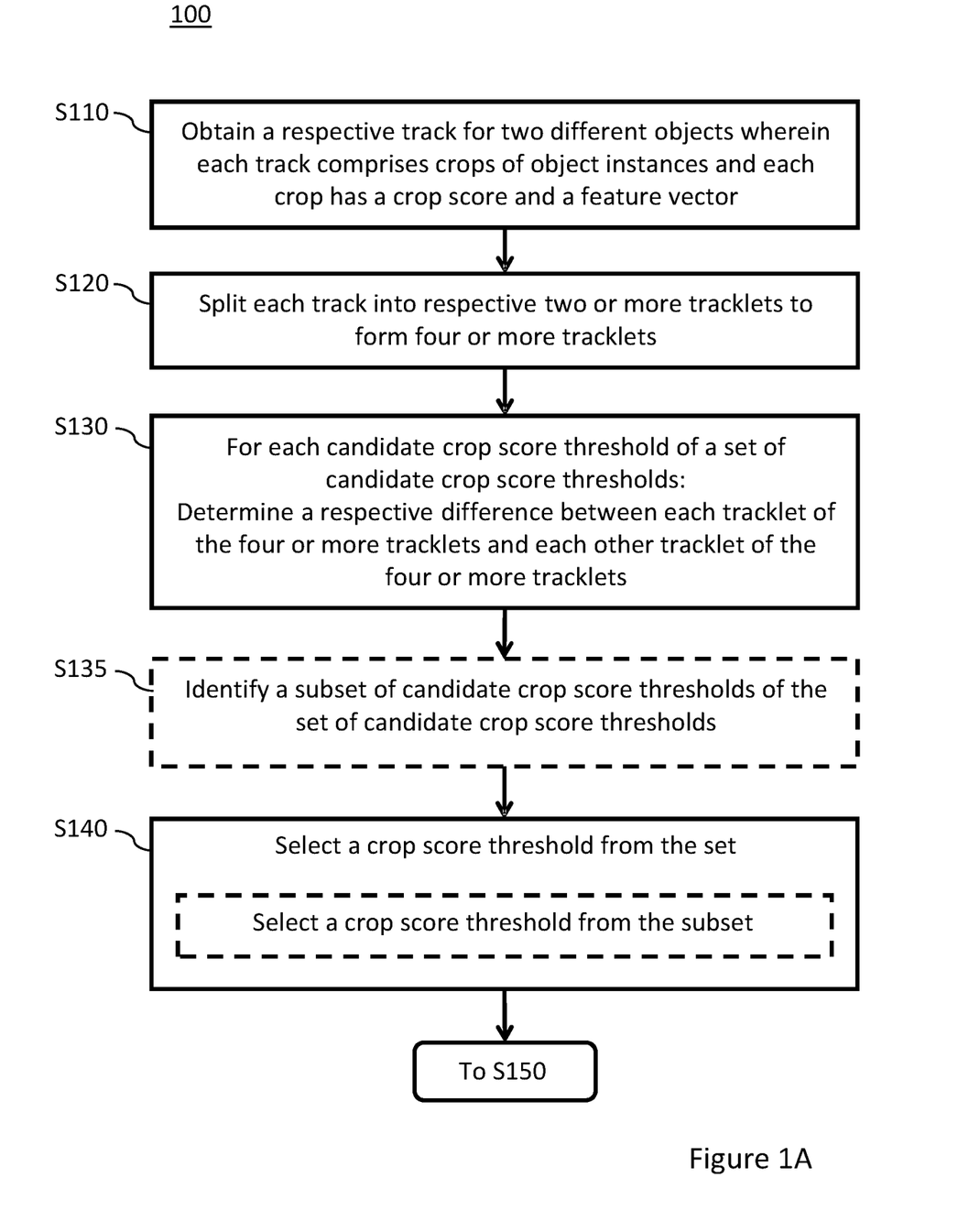
FIGS. 1A and 1B show a flow chart in relation to embodiments of a method of the present disclosure.
Figure 1B:
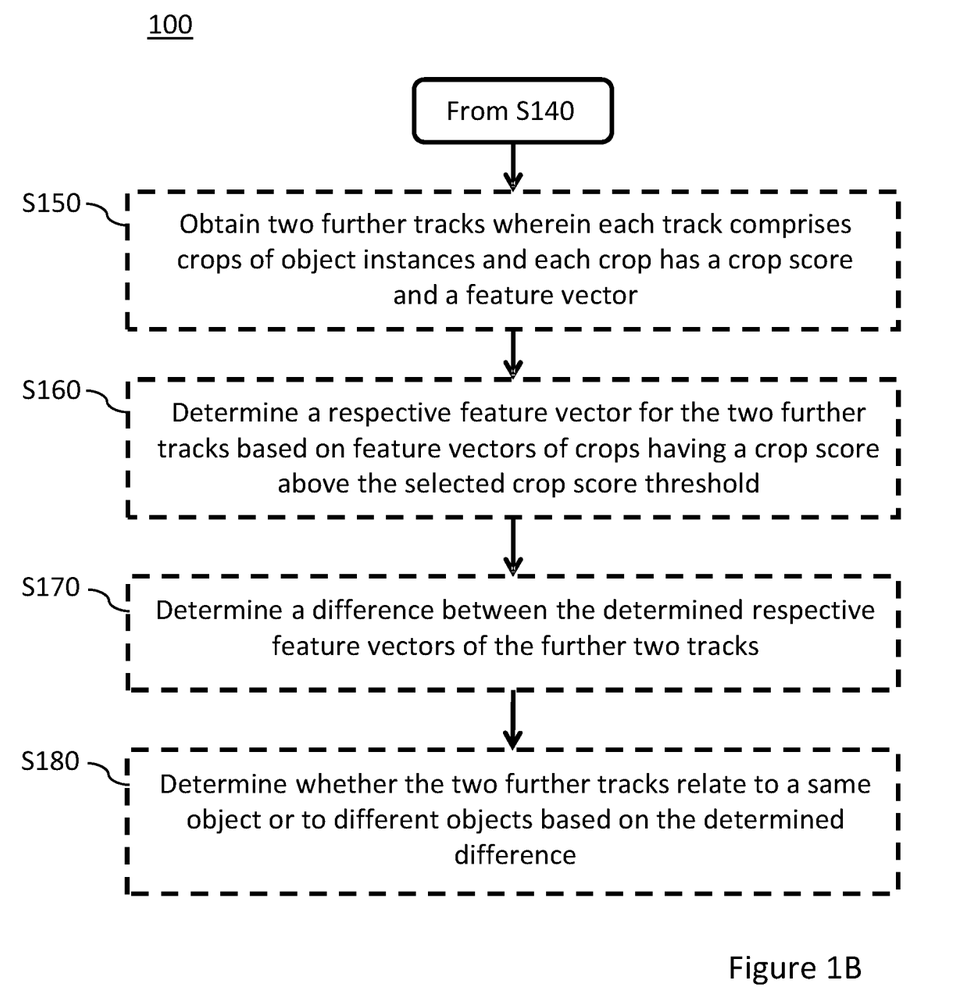

The crop score threshold selected for the scene may be selected according to the method 100 described in relation to FIG. 1A.

Figure 4:
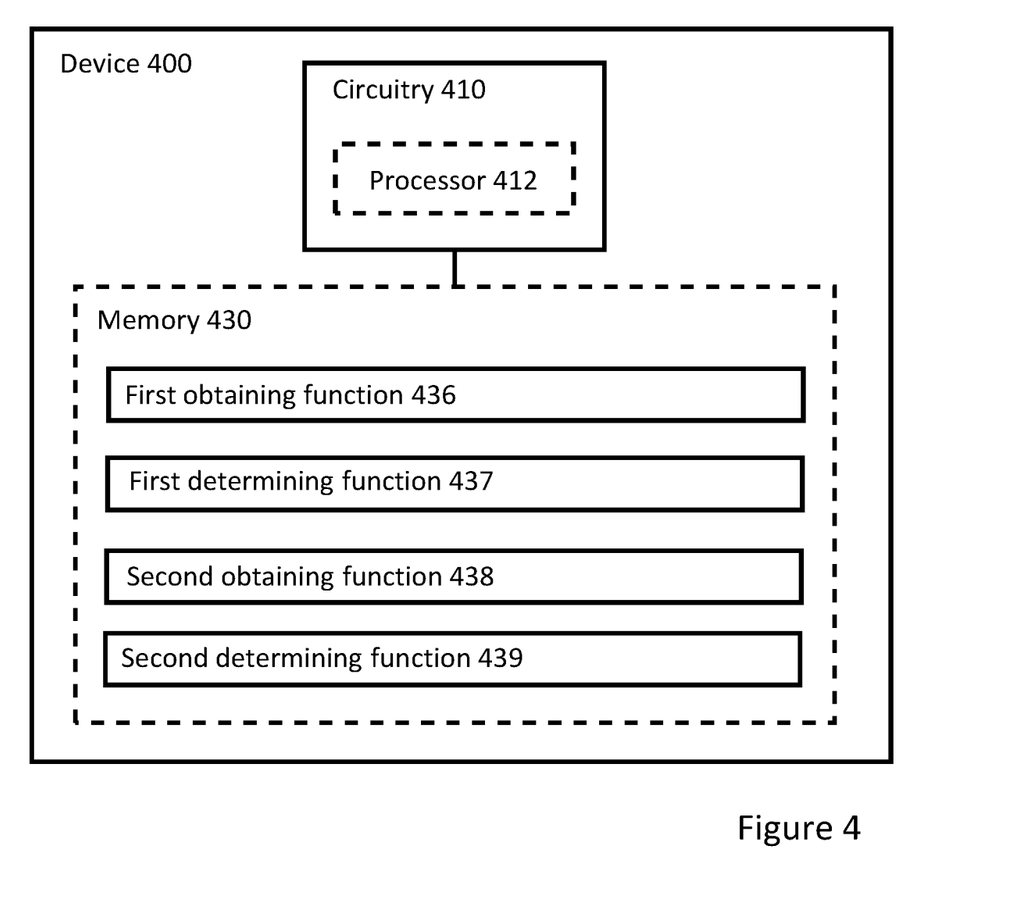
FIG. 4 shows a schematic diagram in relation to embodiments of another device of the present disclosure.

In the following, embodiments of a device 400 for enhancing tracking of objects in a scene captured in a video sequence will be discussed with reference to FIG. 4.

The device 400 comprises circuitry 410. The circuitry 410 is configured to carry out functions of the device 400. The circuitry 410 may include a processor 412, such as a central processing unit (CPU), microcontroller, or microprocessor. The processor 412 is configured to execute program code. The program code may for example be configured to carry out the functions of the device 400.

The device 400 may further comprise a memory 430. The memory 430 may be one or more of a buffer, a flash memory, a hard drive, a removable media, a volatile memory, a non-volatile memory, a random access memory (RAM), or another suitable device. In a typical arrangement, the memory 430 may include a non-volatile memory for long term data storage and a volatile memory that functions as device memory for the circuitry 410. The memory 430 may exchange data with the circuitry 410 over a data bus. Accompanying control lines and an address bus between the memory 430 and the circuitry 410 also may be present.

Functions of the device 400 may be embodied in the form of executable logic routines (e.g., lines of code, software programs, etc.) that are stored on a non-transitory computer readable medium (e.g., the memory 430) of the device 400 and are executed by the circuitry 410 (e.g., using the processor 412). Furthermore, the functions of the device 400 may be a stand-alone software application or form a part of a software application that carries out additional tasks related to the device 400. The described functions may be considered a method that a processing unit, e.g. the processor 412 of the circuitry 410 is configured to carry out. Also, while the described functions may be implemented in software, such functionality may as well be carried out via dedicated hardware or firmware, or some combination of hardware, firmware and/or software.

The circuitry 410 is configured to execute a first obtaining function 436, a first determining function 437, a second obtaining function 438, and a second determining function 439.

The first obtaining function 436 is configured to obtain a track relating to an object of one or more objects in the scene captured in the video sequence, wherein the track comprises crops of object instances of the object of the one or more objects, and wherein each crop has a crop score and a feature re-identification vector.

The first determining function 437 is configured to determine a feature vector for the track based on feature vectors of crops of the track having a crop score above a selected crop score threshold.

The second obtaining function 438 is configured to obtain a further crop of an object instance of one of the one or more objects in the scene captured in the video sequence, wherein the crop has a crop score selected for the scene and a feature vector.

The second determining function 439 is configured to, on condition that the crop score of the further crop is greater than the crop score threshold selected for the scene, determine difference is between the determined respective feature vector of the two tracks, and determine whether the further crop and the track relate to a same object or to different objects based on the determined difference. The crop score threshold selected for the scene may for example be selected according to the method according to the first aspect.

Further details regarding the functions the circuitry 410 is configured to execute are provided in relation to the corresponding acts of the method 300 for enhancing tracking of objects in a scene captured in a video sequence.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method for selecting a crop score threshold for enhancing tracking of objects in a scene captured in a video sequence, the method comprises:
obtaining a respective track for each of two different objects, wherein each track comprises crops of object instances of the respective object in the scene captured in a calibration video sequence, and wherein each crop has a crop score and a feature vector;
splitting each track into respective two or more tracklets thereby forming four or more tracklets;
for each candidate crop score threshold of a set of candidate crop score thresholds:
determining a respective feature vector for each of the four or more tracklets based on feature vectors of crops of the tracklet having a crop score above the candidate crop score threshold; and
determining a respective difference between each tracklet of the four or more tracklets and each other tracklet of the four or more tracklets as a respective difference between each determined respective feature vector and each other determined respective feature vector; and
selecting a crop score threshold from the set of candidate crop score thresholds resulting in a maximum difference between a measure of the determined differences between feature vectors from tracklets of different tracks and a measure of the determined differences between feature vectors from tracklets of the same track.

2. The method according to claim 1, wherein, in the act of determining a respective feature vector, the respective feature vector for each of the four or more tracklets is determined as a mean or median of the feature vectors of crops of the tracklet having a crop score above the candidate crop score threshold.

3. The method according to claim 1, wherein, in the act of selecting a crop score threshold, the measure is a mean or median.

4. The method according to claim 1, further comprising:
identifying a subset of candidate crop score thresholds consisting of each candidate crop score threshold of the candidate crop score thresholds for which a number of crops having a crop score above the candidate crop score threshold is larger than or equal to a first required number for each tracklet of the four or more tracklets,
wherein, in the act of selecting a crop score threshold, the crop score threshold is selected from the subset of candidate crop score thresholds.

5. The method according to claim 1, further comprising:
obtaining two further tracklets relating to one or more objects, wherein each tracklet comprises crops of object instances of one of the one or more objects in the scene captured in the video sequence, and wherein each crop has a crop score and a feature vector;
determining a respective feature vector for each tracklet of the two further tracklets based on feature vectors of crops of the respective tracklet having a crop score above the selected crop score threshold;
determining a difference between the determined respective feature vector of the further two tracklets; and
determining whether the two further tracklets relate to a same object or to different objects based on the determined difference.

6. The method according to claim 5, wherein the act of determining whether the two tracklets relate to a same object or to different objects comprises:
determining that the two further tracklets relate to a same object on condition that the determined difference is below a difference threshold; and
determining that the two further tracklets relate to different objects on condition that the determined difference is above the difference threshold.

7. The method according to claim 5, wherein, in determining a respective feature vector for each of the two further tracklets, if the number of crops of the tracklet having a crop score above the selected crop score threshold is less than a second required number, the respective feature vector is determined based further on additional crops of the tracklet having largest crop scores of crops having crop scores equal to or below the selected crop score threshold such that the number of crops on which the feature vector is based is equal to the second required number.

8. A non-transitory computer-readable storage medium having stored thereon instructions for implementing the method according to claim 1 when executed by a device having processing capabilities.

9. A device for enhancing tracking of objects in a scene captured in a video sequence, which device comprises circuitry configured to execute:
a first obtaining function configured to obtain a respective track for each of two different objects, wherein each track comprises crops of object instances of the respective object in the scene captured in a calibration video sequence, and wherein each crop has a crop score determined by a classifier and a feature vector;
a splitting function configured to split each track into respective two or more tracklets thereby forming four or more tracklets;
a first determining function configured to, for each of a set of candidate crop score thresholds:
determine a respective feature vector for each of the four or more tracklets based on feature vectors of crops of the tracklet having a crop score above the candidate crop score threshold, and
determine a respective difference between each tracklet of the four or more tracklets and each other tracklet of the four or more tracklets as a difference between each determined respective feature vector and each other determined respective feature vector; and a selecting function configured to select a crop score threshold from the set of candidate crop score thresholds resulting in a maximum difference between a measure of the determined differences between tracklets of different tracks and a measure of the determined differences between tracklets of the same track.

10. The device according to claim 9, further comprising:
an identifying function configured to identify a subset of candidate crop score thresholds for which a number of crops having a crop score above the candidate crop score threshold is larger than or equal to a first required number for each tracklet of the four or more tracklets,
wherein, in the selecting function, the crop score threshold is selected from the subset of candidate crop score thresholds.

11. The device according to claim 9, further comprising:
a second obtaining function configured to obtain two further tracklets relating to one or more objects, wherein each tracklet comprises crops of object instances of one of the one or more objects in the scene captured in the video sequence, and wherein each crop has a crop score determined by a classifier and a feature vector;

a second determining function configured to determine a respective feature vector for each of the two further tracklets based on feature vectors of crops of the tracklet having a crop score above the selected crop score threshold; and a third determining function configured to determine a difference between the determined respective feature vector of the two further tracklets; and a fourth determining function configured to determine whether the two further tracklets relate to a same object or to different objects based on the determined difference.

12. A method for enhancing tracking of objects in a scene captured in a video sequence, the method comprises:

selecting a crop score threshold for the scene according to the method of claim 1 obtaining a track relating to an object of one or more objects in the scene captured in the video sequence, wherein the track comprises crops of object instances of the object of the one or more objects, and wherein each crop has a crop score and a feature vector;

determining a feature vector for the track based on feature vectors of crops of the respective track having a crop score above the crop score threshold selected for the scene;

obtaining a further crop of an object instance of one of the one or more objects in the scene captured in the video sequence, wherein the crop has a crop score selected for the scene and a feature vector; and on condition that the crop score of the further crop is greater than the crop score threshold selected for the scene:
determining a difference between the determined feature vector of the track and the feature vector of the further crop; and
determining whether the further crop and the track relate to a same object or to different objects based on the determined difference.

* * * * *